United States Patent [19]

Jänsch

[11] Patent Number: 4,753,108

[45] Date of Patent: Jun. 28, 1988

[54] APPARATUS FOR TESTING CONNECTIONS BETWEEN PIECES OF PIPING FOR IMPERMEABILITY TO GASES

[75] Inventor: Manfred Jänsch, Garbsen, Fed. Rep. of Germany

[73] Assignee: Weatherford Oil Tool GmbH, Langenhagen, Fed. Rep. of Germany

[21] Appl. No.: 24,347

[22] Filed: Mar. 11, 1987

[30] Foreign Application Priority Data

Mar. 15, 1986 [DE] Fed. Rep. of Germany ....... 3608814

[51] Int. Cl.⁴ ............................................. G01M 3/28
[52] U.S. Cl. ........................................ 73/49.8; 73/46; 138/90
[58] Field of Search ................ 73/49.8, 40.7, 49.1, 73/49.5, 46, ; 138/90

[56] References Cited

U.S. PATENT DOCUMENTS

| 2,155,602 | 4/1939 | Keulers | 138/90 |
| 2,246,885 | 6/1941 | Jones | 73/46 |
| 2,334,303 | 11/1943 | Allen et al. | 73/46 |
| 3,803,901 | 4/1974 | McConnell et al. | 138/90 |
| 3,975,945 | 8/1976 | Hauk et al. | 73/46 |
| 4,429,566 | 2/1984 | Armell et al. | 73/40.7 |
| 4,557,139 | 12/1985 | Cantwell et al. | 73/40.7 |
| 4,571,986 | 2/1986 | Fujii et al. | 73/49.8 |
| 4,646,559 | 3/1987 | Toelke | 73/49.8 |

FOREIGN PATENT DOCUMENTS 163125 4/1958 Sweden ................ 73/49.8

Primary Examiner—Stewart J. Levy
Assistant Examiner—Hezron E. Williams
Attorney, Agent, or Firm—Peter K. Kontler

[57] ABSTRACT

Apparatus for testing the impermeability to gases of connections between pieces of piping, especially between pipes and sleeves, utilizes tow elastic sealing bodies that are spaced apart from each other. The sealing bodies can be pressed against the surfaces of the pipes in response to the application of axial stresses to thus confine the testing location which is to be monitored. The first sealing body is located in the pipe inwardly of the testing location and is adapted to be pressed from within against the surface of the pipe, and the second sealing body can be pressed against the periphery of the sleeve. This renders it possible to test, already within the manufacturing plant, even short pieces of piping for impermeability to leaks.

10 Claims, 2 Drawing Sheets

APPARATUS FOR TESTING CONNECTIONS BETWEEN PIECES OF PIPING FOR IMPERMEABILITY TO GASES

BACKGROUND OF THE INVENTION

The invention relates to an apparatus for ascertaining the impermeability to gases of connections between pieces of piping, especially between pipes and sleeves, by utilizing two ring-shaped elastic sealing bodies which are spaced apart from one another and whose diameters are variable in response to axial stressing by pressure applying pistons which are movable in the longitudinal direction of the piping. The location to be tested is disposed between the seals and is confined by a sealing flange which is provided with a bore for evacuation of leak gas to measuring instruments.

In order to eliminate leaks in connection between pipes, it is customary to subject the pipings to a test for the determination of leaks before the pipings are put to use, for example, prior to being lowered into a borehole. To this end, a pressurized testing medium is applied to the connection and the pressure is monitored to ascertain a drop of pressure.

In accordance with a further testing procedure for determination of leaks, it is known to convey a gas through two pieces of piping which are connected to each other. The gas pressure is applied from within with assistance from a sealing tool. Such method and a tool for the practice of the method are disclosed, for example, in German Offenlegungsschrift No. 30 30 665. This publication shows two ring-shaped seals of resiliently yieldable material which are spaced apart form each other and are biased axially against each other by two pistons each of which cooperates with one of the seals. In this manner, one ensures that the seals abut the internal surfaces of the pieces of piping which are connected to each other to form a testing chamber into which the testing gas, for example helium, is admitted at elevated pressure. In the region of testing locations, the other side of this testing chamber is connected with measuring instruments which detect ("sniff") the quantities of gases that happen to escape. However, the tool is not suitable for the testing of sealing locations between short pieces of piping, especially not in the case of connection of the end of a pipe to a sleeve, because the testing location is disposed at a short distance from the free end of the sleeve or from the end of the pipe. The conventional tool is suitable only for insertion, in its entirety, into pipes which are connected to each other and is thus suitable for use in a drilling tower.

OBJECTS AND SUMMARY OF THE INVENTION

An object of the invention is to construct a testing apparatus of the aforedescribed design in such a way that the connections between short pieces of piping, especially between a pipe and a sleeve, can be tested for the absence of leaks already in the manufacturing plant. The solution is characterized in that a first sealing body is adapted to be pressed against the wall of the pipe from within inwardly of the testing location, and a second sealing body extends around the periphery of the sleeve, and in that the testing location is surrounded by a sealing flange which is provided with a bore to convey leak gases to measuring instruments. The apparatus renders it possible to supply a testing medium along the internal surface of the sleeve and the end of the pipe on to a sealing point inwardly of the testing location. In this manner, the pressurized testing medium is capable of penetrating between the sealing surfaces of the sleeve and pipe end if the seal is unsatisfactory. Under such circumstances, testing gas issues through the annular clearance between the threaded end of the sleeve and the external surface of the pipe and can pass through the bore of the sealing flange into a conduit for the purposes of measurement. The apparatus can be applied to the free end of the sleeve in a simple manner. It preferably comprises a carrier body which carries the first sealing body and extends into the pipe, the second sealing body being provided on a shell-like second carrier body which surrounds the end of the pipe. The two carrier bodies are fixedly connected to each other, preferably by means of threads. In the region of the testing location, there is provided a testing flange which can be clampingly connected with the outer carrier body. It comprises two half shells which can be biased against each other in order to achieve the required sealing effect for confinement of the testing location.

The solution according to the invention renders it possible to provide an effective apparatus for testing of the connections between short pipeces of piping or between pipes and sleeves, which can be manipulated in a simple way and which renders it possible to carry out the testing operation at the time of making the connection to thus avoid the transport of pipes which are not sufficiently leakproof.

DESCRIPTION OF THE PREFERRED EMBODIMENTS

Figure 1:
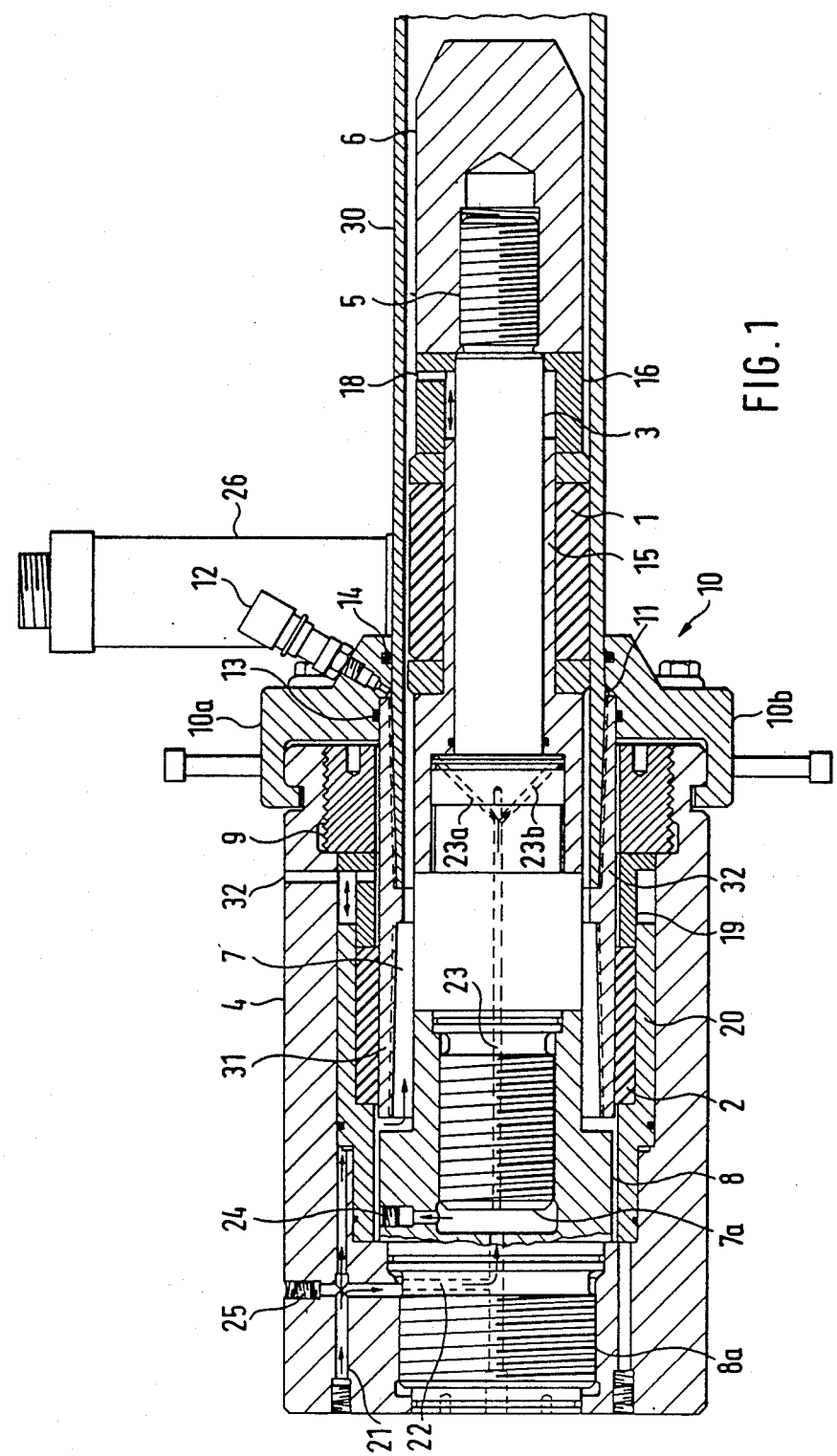
FIG. 1 is a longitudinal sectional view of the testing apparatus applied to a pipe sleeve which is shown by broken lines and is threadedly connected with the end of a pipe.
Figure 2:
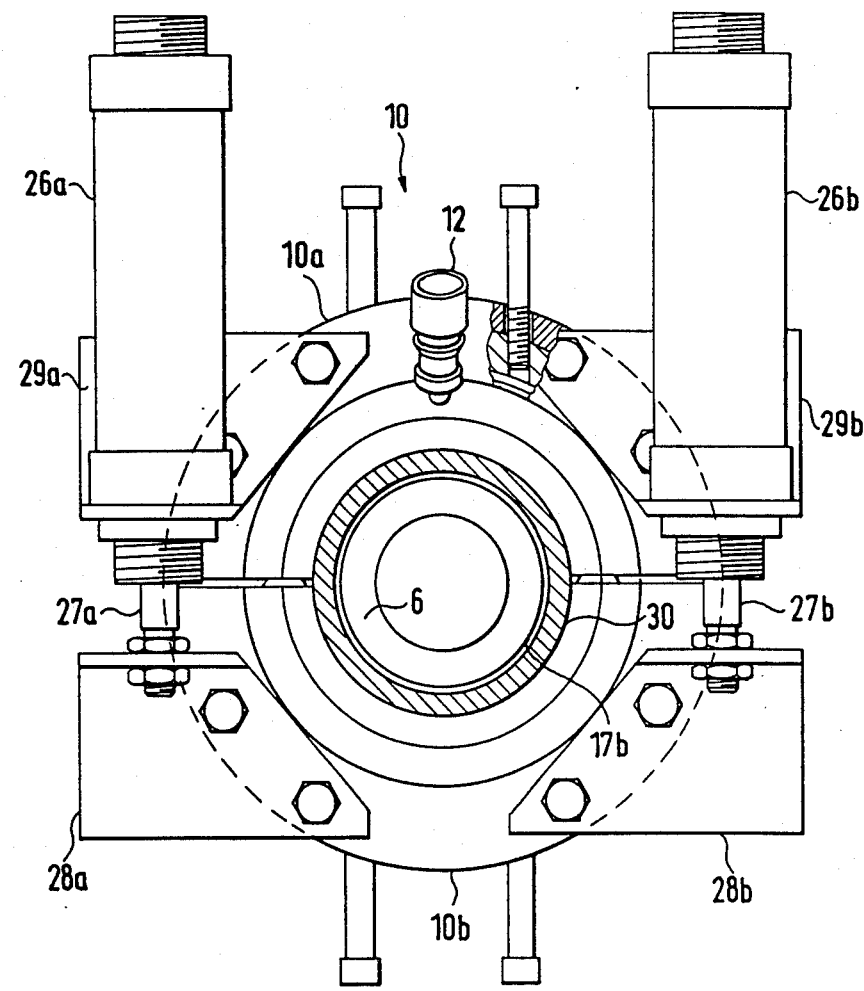
FIG. 2 is a front elevational view of the testing apparatus of FIG. 1.

The essential individual parts of the apparatus are denoted by the following reference characters:
1: first sealing body (packing)
2: second sealing body (packing)
3: inner carrier body for sealing body 1
4: outer carrier body for sealing body 2
5: threaded stub
6: terminal nut
7: distancing element
7a: threaded stub of the distancing element
8: outer end piece of the carrier body 3
8a: threaded stub of the end piece 8
9: terminal nut for the outer carrier body 3
10: sealing flange (sniffing clamp)
10a: upper half shell of the sealing flange 10
10b: lower half shell of the sealing flange 10
11: annular chamber between sealing flange 10 and testing location
12: connecting coupling for the leak gas conduit
13 and 14: O-rings
15: pressure applying piston for the first sealing body
16: distancing sleeve
17a and 17b: supporting rings for the first sealing body
18: aerating bore of the distancing sleeve 16
19: distancing sleeve
20: pressure applying piston for the second sealing body
21, 22, 23: supply channels for testing medium 23a and 23b: branch channels
24: nozzle
25: sealing plug
26a, 26b: pneumatic displacing cylinders
27a, 27b: piston rods
28a, 28b: angular profiles of the lower half shell of the sealing flange
29a, 29b: angular profiles of the upper half shell of the sealing flange
30: pipe
31: sleeve
31a: sealing collar of the sleeve
32: aerating bore in the outer carrier body 4

Upon completed establishment of a fixed threaded connection between the sleeve 31 and the pipe 30, the testing apparatus is slipped onto the end of the sleeve and is clamped by means of the sealing flange 10 which consists of two half shells 10a and 10b. The sealing flange 10 is mounted in such a way that it confines the testing location between two O-rings 13 and 14 and seals it completely from the outside. The testing operation involves monitoring the annular gap between the pipe 30 and the sleeve 31. Leak gas which happens to issue can be collected in an annular chamber 11 which is formed by the sealing flange 10 and the pipe 30 repectively the inner end of the flange 31. When the application of the testing apparatus is completed, the sealing shells 10a and 10b of the sealing flange 10 are pressed against each other with assistance from pneumatic displacing cylinders 26a and 26b so that the annular gap is adequately sealed from the outside. Angle irons 28a, 28b respectively 29a, 29b ensure the establishment of a rigid connection between the half shells 10a, 10b of the sealing flange 10 through the medium of the cylinders 26a, 26b (connected to the half shell 10a) and piston rods 27a, 27b (connected to the half shell 10b). In the next step, the testing medium, for example helium, can be forced into the apparatus at an elevated pressure by way of supply channels 21, 22, 23. The testing medium serves as a working medium for actuation of the pressure applying pistons 15 and 20 for the sealing bodies 1 and 2 as well as for actually testing the impermeability to gases of the threaded connection between the pipe and the sleeve.

In response to the pressure of testing medium, the pressure applying pistons 15 and 20 are shifted to the right, as seen in FIG. 1, so that the sealing bodies 1 and 2 are compressed and undergo changes in their diameters. At such time, the sealing body 1 is forced against the internal surface of the pipe 30 and the sealing body 2 is forced against the external surface of the sleeve 31. In this manner, testing medium which penetrates into the annular space between the sleeve 31, pipe 30 and the periphery of the inner carrier body by way of supply channel 23 and the calibrated bore of a nozzle 24 is prevented from penetraing deeper into the interior of the pipe respectively from flowing along the external surface of the sleeve. This renders it possible to build up the pressure which is required for the testing operation.

If the ring-shaped sealing surface between the outer end of the pipe 30 and the sealing collar 31a of the sleeve fails to furnish a satisfactory sealing action, testing gas could penetrate into the threads between the pipe 30 and the sleeve 31 and gradually migrate all the way to the annular chamber 11 wherefrom leak gas could flow through the connecting coupling of a leak gas conduit to flow therefrom to the measuring instruments. Upon completion of the testing operation, the half shells of the sealing flange are removed in a first step upon relaxation of pressure in the pneumatic pressure applying cylinders and, in the next step, the testing apparatus is slipped off its seat. As can be seen, the mounting and removal of the testing apparatus are extremely simple so that the apparatus is suitable for rapid testing of impermeability to gases already in the manufacturing plant.

I claim:

1. Apparatus for monitoring the permeability of a selected part of a connection between two pieces of piping, particularly a threaded connection between a pipe and a sleeve, comprising two ring-shaped elastic sealing bodies whose cross-sections increase in response to axial stressing, the first of which is arranged to be inserted into one piece of piping and the second of which is arranged to surround the other piece of piping so that the selected part of the connection between such pieces of piping is flanked by said sealing bodies; first and second pressure applying pistons movable with reference to and arranged to thereby axially stress the respective sealing bodies; a sealing flange arranged to surround the selected part of the connection and defining a passage for conveying lead fluid to measuring instrumentalities; a first carrier arranged to be disposed in the first sealing body so that the latter is confined between and sealingly engages said first carrier and the one piece of piping in response to axial stressing by said first piston; a second carrier sealingly connectable to said first carrier and arranged to surround said second sealing body so that the latter is confined between and sealingly engages said second carrier and the other of said two pieces of piping in response to axial stressing by said second piston; and means for admitting leak fluid into the other piece of piping.

2. The apparatus of claim 1, wherein said flange includes two seals arranged to sealingly engage the connection from the outside so that the selected part of the connection is flanked by said seals, said passage having an inlet between said seals.

3. The apparatus of claim 1, wherein said flange comprises a plurality of shells and means for pressing said shells against the pieces of piping.

4. The apparatus of claim 3, wherein said pressing means comprises fluid-operated cylinder and piston means.

5. The apparatus of claim 1, wherein said first carrier comprises a plurality of sections which are threadedly connected to each other.

6. The apparatus of claim 1, wherein said first piston includes a sleeve which slidably surrounds said first carrier and has an external shoulder, and further comprising a ring interposed between said shoulder and said first sealing body.

7. The apparatus of claim 1, wherein said second carrier includes a first sleeve surrounding said second piston, said second piston including a second sleeve having an internal shoulder which abuts said second sealing body.

8. The apparatus of claim 1, wherein said second carrier has an internally threaded portion in the region of said flange and further comprising a nut mating with said internally threaded portion and a distancing sleeve betwen said nut and said second sealing body.

9. The apparatus of claim 1, wherein one of said carriers has external threads and the other of said carriers has internal threads arranged to mate with said external threads so as to establish a separable connection between said carriers.

10. The apparatus of claim 1, wherein said flange has at least one claw arranged to form-lockingly engage said second carrier.

* * * * *